3,629,468
HYGROSCOPICALLY CONTROLLED EFFERVESCENT MOUTHWASH TABLET
Howard P. Andersen, 419 E. Summit Ave.,
Oconomowoc, Wis. 53066
No Drawing. Filed Apr. 21, 1969, Ser. No. 818,099
Int. Cl. A61k 9/00, 11/02, 11/04
U.S. Cl. 424—44                                    12 Claims

ABSTRACT OF THE DISCLOSURE

An effervescent mouthwash tablet comprising a germicidal agent, chlorophyll, an alkali metal carbonate salt, adipic acid, flavoring ingredients, and sweetening agents.

BACKGROUND OF THE INVENTION

(1) Field of the invention

The present invention relates to the manufacture of a mouth cleansing antiseptic breath freshening agent in tablet form. More particularly, the invention relates to an effervescent mouthwash tablet containing a combination of germicidal and breath freshening agents. The mouthwash tablets obtained according the present invention are highly effective when employed to kill germs, freshen the breath, neutralize mouth acids, and effervescently flush away loose food particles, while at the same time they exhibit the highly desirable characteristics of ease of manufacture, excellent stability during packaging, shipping and storage, and finally, simplicity in personal administration.

(2) Description of the prior art

The prior art is dotted over a period extending back fifty years with disclosures touching upon the topics of effervescent compositions and tablet formulations of these compositions. In virtually all of these prior art teachings, particularly those relating to tablets, the desired product is one which will rapidly dissolve when placed in an aqueous medium. To this end, such heretofore known effervescent powders and tablets have employed as the acid component of their effervescent couple only those organic acids which are highly soluble in water. The fruit acids have proven very practical, and citric acid and tartaric acid in particular have been employed almost exclusively. See for instance U.S. Pats. 1,262,888 to Westlake, 2,985,562 to Millard et al., and 3,151,028 to Hay et al.

It has been generally noted, however, that each of the prior art products suffers from several serious drawbacks, namely, that they are extremely burdensome to prepare, and furthermore, that unless properly prepared and processed they are hygroscopic to the point of such product instability that the resulting performance characteristics are unsatisfactory. Moreover, because of their hygroscopic nature special precautions must be taken to properly package these heretofore known compositions, and inherently poor storage life seriously limits their period of effective usage. As illustrative of the laborious procedures necessary for the preparation of such prior art compositions see "Manufacturing Chemist and Manufacturing Perfumer," vol. 18, No. 4, April 1947, page 188 and Remington's Practice of Pharmacy, 12 ed., 1961, pages 450–451.

The above problems associated with the prior art effervescent products have undoubtedly been responsible to a degree for the noted absence of a commercially acceptable and practically useful antiseptic mouthwash tablet.

SUMMARY OF THE INVENTION

The product obtained in accordance with the present invention, on the other hand, overcomes the difficulties and drawbacks mentioned above, and in comparison with the products heretofore known in the art, it offers the following advantages:

(a) The ingredients are readily mixed and compounded into tablet form without the necessity of laborious heating and drying steps.

(b) No special packaging considerations are necessary, thereby allowing for bulk packaging and storage.

(c) The product has good storage life and remains effective even after prolonged exposure to the atmosphere.

(d) There is no need for the inclusion of any inert fillers or buffer compounds of the type previously used in the art to prevent premature reaction of the active ingredients and inhibit product deterioration resulting from atmospheric moisture or water of hydration contained in any of the product components.

(e) As a result of the combination of compatible and effective germ killing and breath freshening agents, there is realized a product satisfactory for controlling breath and mouth odors caused by both bacteria and loose residual food particles.

It has been found quite unexpectedly that an effervescent tablet intended primarily for oral administration in tablet form is not restricted to the use of the highly soluble effervescent couples employed in the prior art. In fact many of the known formulations when put in tablet form have proven so vigorously effervescent that they are not easily contained in the mouth. As a consequence of this discovery, a new mouthwash tablet has been developed which displays desirably improved stability characteristics and at the same time retains sufficient propensity to dissolve upon oral administration.

DESCRIPTION OF THE PREFERRED EMBODIMENTS

The subject mouthwash tablets of the present invention comprise an active germicidal agent, a breath freshening additive, a mildly effervescent and hygroscopically controlled base consisting of a salt adapted to liberate a neutral gas when brought into aqueous reactive contact with a specific organic acid, artificial sweeteners, and suitable flavoring ingredients.

A profound effect on the ability of the present product to control breath odors has been demonstrated by the inclusion of a germicidal agent. In theory, any such agent compatible with the other ingredients included herein would be satisfactory, however, those germicidal agents of the cationic surface-active class have been found most effective. Examples of these compounds are diisobutylphenoxyethoxyethyl dimethyl benzylammonium chloride, cetylpyridinium chloride, benzethonium chloride, and methylbenzethonium chloride. To impart the desired antiseptic properties to the present mouthwash tablets, the germicidal agent may be present in amounts varying from about 0.05 to 5.0 percent by weight, and preferably from about 0.5 to 2.5 percent by weight.

Chlorophyll has been recognized as an effective breath freshener when administered in the proper amounts and in the proper environment. Incorporation of chlorophyll into the composition of the present invention yields a product which is effective in relieving breath odors due to faulty oral hygiene, halitosis, alcohol, onions, smoking, bad teeth and most other causes. The relative amount present may vary to about 3.0 percent by weight or higher although it has been found that the most effective compositions do not contain more than about 1.5 weight percent.

The desired effervescent action is produced upon the liberation of gaseous carbon dioxide as the product of reaction between the gas liberating salt and organic acid which together constitute the tablet base. This reaction is initiated by bringing the acid and salt into aqueous reactive contact with each other in the mouth e.g. a tablet is placed in contact with the saliva and/or a small quantity of water added to the mouth of the user.

The gas liberating salt employed herein may be any soluble carbonate salt, but is preferably an alkali metal carbonate or bicarbonate or mixtures thereof. Sodium bicarbonate is the most preferred ingredient. An effective product is realized with a sodium bicarbonate content ranging from about 20 to 90 percent by weight. A more preferred range is from about 35 to 75 weight percent.

It has been discovered that the advantageous properties heretofore described are in part directly attributable to the use of adipic acid as the organic acid constituent of the product tablets. In contradistinction to the conventional fruit acids associated with previous effervescent compositions, adipic acid yields a product which is hygroscopically controlled in character. This property enables the product of the instant invention to solve many of the serious prior art problems associated with the undesirable hygroscopic behavior while still retaining the desirable quality of rapid disintegration in the mouth. The adipic acid in proportions of from about 10 to 70 percent by weight yields a satisfactory product. The preferred range is 20 to 55 weight percent. A possible modification within the scope of this invention is the substitution of a minor amount, i.e., less than 10% by weight, of adipic acid with a fruit acid such as citric or tartaric acid in order to achieve faster tablet disintegration in the user's mouth without materially affecting the product stability.

A further discovery embodied in this invention relates to the use of adipic anhydride as the acidic component of the effervescent couple. Although the rate of disintegration is slowed down somewhat by the adipic anhydride a compensating effect is realized by the increased stability afforded as a result of the anhydride groups. The unexpected effectiveness of adipic anhydride may be a result of its substantial water solubility or perhaps the fact that it exists in the form of an unstable polymeric-type structure rather than the stable ring structure normally occurring in dibasic anhydrides. Again, substitution of a minor amount of the anhydride with citric or tartaric acid is within the scope of this invention. Also, mixtures of adipic acid and adipic anhydride are contemplated.

In view of the poor solubility characteristics of the adipic acid and adipic anhydride, it is to be understood that any of the known methods of improving such characteristics e.g. treatments, additives, particle size modifications, etc., are expressly included within the present invention.

To avoid any possible injury to the teeth, and also to provide effective neutralization of any mouth acids naturally present, it is desirable to have the basic sodium bicarbonate present in sufficient excess of the adipic acid to assure an alkaline reaction permanent in nature.

As a matter of practice, it has been found desirable from the standpoint of taste considerations to sweeten preparations which are intended for oral administration. In connection with the present product, this may be accomplished by the addition of a minor amount of natural sweetener or preferably artificial sweeteners such as sodium saccharin and/or sodium cyclamate. A preferred formulation includes a combination of about 1.0 to 7.0 weight percent sodium cyclamate with up to 1.0 weight percent sodium saccharin.

In addition to sweeteners, any desired flavoring additives such as peppermint, cinnamon, etc., may be included in appropriate amounts according to taste. Typically, from about 0.2 to 5.0 weight percent gives a pleasant tasting product.

While it is preferred to include a germicidal agent in the practice of the present invention, a satisfactory but less effective mouthwash tablet may be obtained by compounding the above ingredients without the inclusion of the germicidal agent.

Finally, it is advantageous to incorporate a minor amount of a conventional lubricating agent, as for instance stearic acid, to aid in the preparation of the tablets when molding is contemplated.

Use of the product tablets of the present invention is appropriately simple and straightforward. No pre-mixing of any solution is necessary. The necessary steps comprise placing a tablet into the mouth, followed by about an ounce of water. If water is not available the user's saliva will normally suffice. Effervescence begins at once, and in a very short time dissolution is achieved. At this point the solution may be used as a rinse or gargle, after which it can be readily discharged. In an emergency, or embarrassing situation the solution may be swallowed without harm or ill effects to the user.

The present invention is not dependent upon the manner in which the ingredients are processed and the tablets prepared, so consequently it is to be understood that the mouthwash tablets herein described may be prepared by any established manufacturing procedure or such individual practice as might be employed by one skilled in the art. Included, but not exhaustive, are any of the known molding processes as well as the compression techniques i.e. direct compression, wet granulation or dry granulation (precompression). When compression techniques are employed either a hand punch or rotary tablet machine may be used. Any reasonable size and shape of tablet will yield a satisfactory product.

It will be readily apparent that the degree of compaction will influence both the durability of the tablets as well as their ability to dissolve in aqueous media. The most desirable tablet is one that holds up reasonably well during storage and handling which at the same time is capable of dissolving quite rapidly. To achieve this end, it has been found that a minimum hardness of about 3 to 4 kg. on the Strong-Cobb scale is necessary while values up to about 20 kg. are possible.

In order to further illustrate the instant invention, the following specific examples are given, it being understood that the same are merely intended to be illustrative and in no way limitative. Dry compression techniques are employed as being typical.

EXAMPLE I

The following dry powdered ingredients are prepared in the relative amounts given below, the particle size of the ingredients being from 20 to 250 mesh:

| | Parts by weight |
|---|---|
| Diisobutylphenoxyethoxyethyl dimethyl benzylammonium chloride | 4.0 |
| Chlorophyll | 5.0 |
| Peppermint powder | 5.0 |
| Sodium saccharin | 1.0 |
| Sodium cyclamate | 20.0 |
| Sodium bicarbonate | 300.0 |
| Adipic acid | 210.0 |
| Stearic acid | 5.0 |

The above ingredients are thoroughly mixed together and then subjected to precompression or slugging in a high pressure mold. The resulting slugs are reduced to proper granule size (8 to 20 U.S. standard mesh) with a Fitz Mill comminuting machine, an oscillating granulator, or other suitable device. Next, the granules are fed to a rotary tablet machine to produce 550 mg. tablets of about 4 kg. on the Strong-Cobb hardness scale.

The resulting 550 mg. tablet has a diameter of 5/8 inch and thickness of 1/8 inch. When placed in the mouth with about 1 ounce of water, effervescence begins immediately, and total dissolution takes place in about 20 to 30 seconds depending upon the acidity of the individual user's mouth and the temperature of the water added.

EXAMPLE 2

The procedure of Example 1 is repeated except that 20 parts by weight of adipic acid are replaced with a corresponding amount of citric acid. The resulting 550 mg. tablet when placed in the mouth with about 1 ounce of water dissolves in about 15 to 25 seconds depending upon the acidity of the individual user's mouth and the temperature of the water added.

EXAMPLE 3

The following dry powdered ingredients are prepared in the relative amounts given below, the particle size of the ingredients being from 40 to 300 mesh:

| | Parts by weight |
|---|---|
| Diisobutylphenoxyethoxyethyl dimethyl benzylammonium chloride | 10.0 |
| Chlorophyll | 3.0 |
| Cinnamon powder | 5.0 |
| Sodium saccharin | 0.5 |
| Sodium cyclamate | 14.5 |
| Sodium bicarbonate | 200.0 |
| Sodium carbonate | 65.0 |
| Adipic anhydride | 250.0 |
| Stearic acid | 2.0 |

The above ingredients are thoroughly mixed together and then subjected to precompression or slugging in a high pressure mold. The resulting slugs are reduced to proper granule size (8 to 20 U.S. standard mesh) with a Fitz Mill comminuting machine, an oscillating granulator, or other suitable device. Next, the granules are fed to a rotary tablet machine to produce 550 mg. tablets of about 4 kg. on the Strong-Cobb hardness scale.

The resulting 550 mg. tablet has a diameter of 5/8 inch and thickness of 1/8 inch. When placed in the mouth with about 1 ounce of water, effervescence begins immediately, and total dissolution takes place in about 30 to 40 seconds depending on the acidity of the individual user's mouth and the temperature of the water added.

EXAMPLE 4

The procedure of Example 3 is repeated except that 20 parts by weight of adipic anhydride are replaced with a corresponding amount of tartaric acid. The resulting tablet, when placed in the mouth with about 1 ounce of water dissolves in about 25 to 35 seconds depending upon the acidity of the individual user's mouth and the temperature of the water added.

EXAMPLE 5

The procedure of Example 1 is repeated except that the acidic component consists of 160 parts by weight of adipic acid and 150 parts by weight of adipic anhydride. The resulting 550 mg. tablet has characteristics essentially identical with the product of Example 1.

It is apparent that numerous different embodiments of this invention may be made without departing from the spirit and scope thereof, for instance the substitution of certain ingredients with any of their known equivalents. It is to be understood that the invention is not to be limited to the specific embodiments thereof, except as defined by the appended claims.

What is claimed is:

1. An effervescent mouthwash tablet for direct insertion into the mouth to effect reactive effervescent mouth cleansing, which tablet is non-hygroscopic yet capable of undergoing complete reactive disintegration in the presence of small quantities of water in the mouth, comprising chlorophyll, an acidic component selected from the group consisting of adipic acid, adipic anhydride and mixtures thereof, and a salt capable of evolving carbon dioxide when brought into aqueous reactive contact with said acid component in the mouth.

2. The mouthwash tablet as defined by claim 1 wherein up to about 10 weight percent of the acidic component is replaced with a highly soluble organic acid selected from the group consisting of citric acid and tartaric acid.

3. The mouthwash tablet as defined by claim 1 further comprising a cationic surface-active germicidal agent.

4. The mouthwash tablet as defined by claim 3 further comprising sweetening additives and flavoring ingredients.

5. The mouthwash tablet as defined by claim 4 wherein the salt capable of evolving carbon dioxide is selected from the group consisting of alkali metal carbonates, alkali metal bicarbonates, and mixtures thereof.

6. The mouthwash tablet as defined by claim 5 wherein the salt capable of evolving carbon dioxide is sodium bicarbonate.

7. The mouthwash tablet as defined by claim 6 wherein the germicidal agent is diisobutylphenoxyethoxyethyl dimethylbenzyl ammonium chloride.

8. The mouthwash tablet as defined by claim 7 wherein the acidic component is adipic anhydride.

9. The mouthwash tablet as defined by claim 8 wherein the acidic component is adipic acid.

10. The mouthwash tablet as defined by claim 9 wherein the ingredients are present in amount according to the following ranges of dry weight percentage:
   (a) about 0.3 to 1.5% chlorophyll,
   (b) about 0.5 to 2.5% diisobutylphenoxyethoxyethyl dimethylbenzyl ammonium chloride,
   (c) about 35 to 75% sodium bicarbonate,
   (d) about 20 to 55% adipic acid,
   (e) about 0.9 to 8.0% artificial or natural sweeteners, and
   (f) about 0.2 to 5.0% flavoring ingredients.

11. The mouthwash tablet as defined by claim 9 wherein the ingredients are present in amount according to the following dry weight percentages:

| | Percent |
|---|---|
| Chlorophyll | 0.90 |
| Diisobutylphenoxyethoxyethyl dimethylbenzyl ammonium chloride | 0.75 |
| Sodium bicarbonate | 54.50 |
| Adipic acid | 38.20 |
| Flavoring | .90 |
| Sweeteners | 3.85 |

12. A method for treating the oral cavity which comprises placing an effervescent mouthwash tablet as defined by claim 1 directly into the mouth together with a small quantity of water, and thereafter permitting said tablet to reactively effervesce to a substantial degree of disintegration.

References Cited
UNITED STATES PATENTS

| | | | |
|---|---|---|---|
| 2,448,524 | 9/1948 | Gentner | 117—100 |
| 2,971,848 | 2/1961 | Polya | 99—141 |
| 2,977,300 | 3/1961 | Bergen et al. | 252—18 |
| 2,977,301 | 3/1961 | Bergen et al. | 252—18 |
| 3,105,792 | 10/1963 | White | 424—44 |
| 3,136,692 | 6/1964 | Bandelin | 424—44 |
| 3,355,392 | 11/1967 | Cantor et al. | 252—99 |
| 3,506,756 | 4/1970 | Hoss | 424—44 |
| 3,518,343 | 6/1970 | Welsh et al. | 424—44 |
| 3,518,344 | 6/1970 | Welsh et al. | 424—44 |
| 3,518,345 | 6/1970 | Dines et al. | 424—44 |

SHEP K. ROSE, Primary Examiner

U.S. Cl. X.R.

424—49, 329